United States Patent
Briancon

(10) Patent No.: US 6,640,222 B1
(45) Date of Patent: Oct. 28, 2003

(54) METHOD FOR SELECTING AN INFORMATION UNIT AMONG CONFLICTING INFORMATION UNITS BASED ON CONTEXT FIELDS BY A USER DEVICE

(75) Inventor: Alain C. Briancon, Poolesville, MD (US)

(73) Assignee: Motorola, Inc., Schaumbrug, IL (US)

( * ) Notice: Subject to any disclaimer, the term of this patent is extended or adjusted under 35 U.S.C. 154(b) by 269 days.

(21) Appl. No.: 09/677,308

(22) Filed: Sep. 29, 2000

(51) Int. Cl.[7] ............................................. G06F 17/00
(52) U.S. Cl. ............................................. 707/3; 707/10
(58) Field of Search .................. 707/1–7, 10, 100, 707/200, 203, 104.1

(56) References Cited

U.S. PATENT DOCUMENTS

| | | | | |
|---|---|---|---|---|
| 4,358,824 A | * | 11/1982 | Glickman et al. ............. | 707/5 |
| 5,842,210 A | * | 11/1998 | Chen et al. .................... | 707/10 |
| 6,094,649 A | * | 7/2000 | Bowen et al. .................. | 707/3 |
| 6,108,533 A | * | 8/2000 | Brohoff ........................ | 455/414 |
| 6,490,579 B1 | * | 12/2002 | Gao et al. ...................... | 707/4 |

OTHER PUBLICATIONS

Joseph et al "Rover: A Toolkit for Mobile Information Access", ACM 1995, pp. 156–171.*
Myaeng et al "Towards an Intelligent and Personalized Retrieval System", ACM 1986, pp. 121–129.*

* cited by examiner

*Primary Examiner*—Uyen Le
(74) *Attorney, Agent, or Firm*—Hasashi D. Watanabe

(57) ABSTRACT

A method and apparatus for providing data synchronization and/or resolving data conflicts is disclosed. In today's data communication environment multiple pieces of information may be received by a device and one of the pieces must be selected for processing or storage. The present system assigns a context value to each piece of information to describe the relevance of the piece of information to a recipient. When a recipient recognizes that it has received two or more pieces of information purporting to serve the same purpose, the context values of the pieces of information are evaluated and the piece of information having the largest context value, representing the most relevance to the recipient, is selected.

8 Claims, 1 Drawing Sheet

METHOD FOR SELECTING AN INFORMATION UNIT AMONG CONFLICTING INFORMATION UNITS BASED ON CONTEXT FIELDS BY A USER DEVICE

BACKGROUND OF THE INVENTION

The present application relates to synchronization of data and particularly to methods and apparatus for selecting among multiple information units purporting to fulfill the same need.

The amount of data created, exchanged and used in modern society has created a somewhat unique set of problems. It is not infrequent with modern computer networks to have multiple copies of data all purporting to fulfill the same need. For example, when a user downloads a file to his or her palm top and modifies the file, only to return the modified file to the is personal computer (PC) from which the original was downloaded. The selection of which file to keep is a data synchronization problem.

The most usual solution to the data synchronization problem is to date stamp all files and select the most recent for continued storage and use. In the PC/palm top example, the most recent version whether it be on the palm top or the PC would be the version saved. When the breadth of data sources increase, such as by connection to a computer network, e.g., the Internet, the problem becomes more complex. Data requiring synchronization may arrive from many sources and may all be date stamped. However, the receiver does not know which unit of the received data is credible. Just because the data was the most recently received or transmitted does not by itself make the data more relevant than older but confirmed good data or data prepared by a different source.

Consider an out-of-office sales person who needs to know the prices of products to be sold. Data may be received from many sources, all purporting to be the list from which the sales person produces cost quotations. One list may come from the home business office, another from the marketing vice president and a third from the sales person's immediate supervisor. These different sources may provide more information about the relevance than does the exact time that the data was prepared or transmitted. In another example, the data may not be from different places but it may all be differently distributed. Some data may be addressed to a large geographical area or to a large number of users while potentially conflicting data may be directed to just a few recipients or perhaps to one receiver only. The receiver of data purporting to fulfill the same need (conflicting data) is met with many different data copies from which a selection cannot be adequately made using present day synchronizing techniques. Thus, data synchronization remains a problem with current data selection solutions.

DESCRIPTION

The problems of the art are solved and an advance is achieved in accordance with the invention. An information unit is assigned a Context value which reflects the possible relevance of the information unit to which it is assigned to information unit users. When conflicting information units are detected, their respective context values are compared and the one having a context value indicating greater possible relevance is selected for processing and/or storage.

The Context value may be comprised of a plurality of sub-context values referred to herein as Concept, Scope, Range, Focus and Lobby. Concept represents the number of users to which an information unit is intended. The larger the number of intended users the smaller the contribution of Concept to Context. That is, the largest Context value will result from an information unit intended for a single user. The Range is the geographic or logical dispersion of the information unit to which it is assigned. An information unit distributed throughout the U.S. will result in a smaller Context than such an information unit dispersed only on a single LAN in a single community.

Focus qualifies the source of an information unit from the perspective of the user. For example, when the source of the information unit is the user's boss, the Focus value will lead to a relatively high Context value while the Focus value for an outsider to the user's company will lead to a relatively lower Context.

The synchronization of data using an assigned Context can be employed for synchronizing a palm top with a PC and it can be used to select between received information units which purport to satisfy a user need. The context values may be transmitted with the information units to which they are assigned or they may be transmitted before or after such information units.

The embodiments described herein are methods and apparatus for selecting for processing or storing by a user, one of a plurality of conflicting pieces of information. A piece of information may be of any size but it is expected that the present embodiments will be most useful for information of a significant size such as, for example, greater than 1 kilobyte. Conflicting pieces of information are pieces of information which purport to solve the same user need. The current price list for salable products may be one example of possibly conflicting pieces of information. Data which represents a plurality of possible solutions to a problem (or which is the result of an Internet key word search) may make up another.

Figure 1:
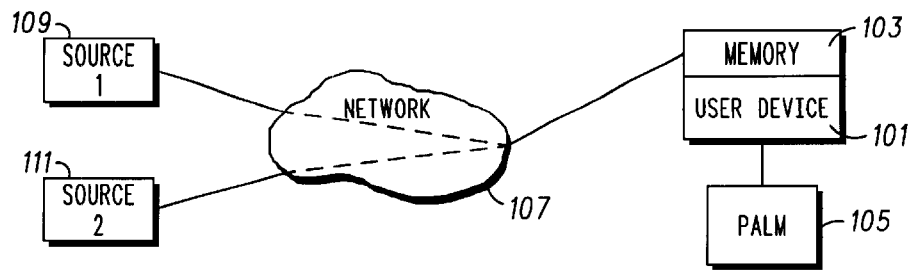
FIG. 1 is a block diagram of a data distribution system.

FIG. 1 represents an environment in which conflicting pieces of information may arise from the viewpoint of a user computer 101 which includes a memory 103. The user computer 101 is connected to a palm device 105 which can supply pieces of information to the user. The information from the palm 105 may be original information or may be information previously downloaded from the memory 103 user computer 101, amended and returned to the user computer. Upon return a possible conflict may exist regarding which version, i.e. the memory version or the palm version, is to be stored in memory 103 and/or processed by the user computer 101.

User computer 101 is also connected via a network 107 to a plurality of information sources of which information sources 109 and 111 are specifically shown. The network 107 may, for example, be the well known Internet and the sources 109 and 111 may be servers connected to the Internet. The sources 109 and 111 may be widely separated and may be controlled by entirely different people or groups. Information conflicts will occur at user computer 101 when it recognizes that it has received two pieces of information or the identities of two pieces of information which purport to fulfill the same user need.

In the present embodiment, a context field is associated with the various pieces of information. The user computer 101 makes decisions about which data to keep or process and which to discard on the basis of the context field. The context field identifies to the user computer the likely relevance of the associated piece of information to the user. When the likely user relevance (context) of a first piece of information is higher than the likely user relevance of a second, conflicting piece of information, the first information will be kept and/or processed and the second will be discarded.

Figure 2:
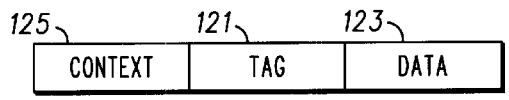
FIG. 2 is a representation of a digital network message.

FIG. 2 represents an association of fields related to pieces of information as such information may be transmitted. FIG. 2 includes a tag field 121, a data field 123 and a context field 125. The data field 123 represents the piece of information associated with the tag and context fields. The tag field 121 includes source and destination addresses and other communication defining variables regarding the data field 123. The context field 125 contains information from which the context or relevance to the user may be determined. FIG. 2 represents the tag, data and context fields as a series string which may be the way in which pieces of information are communicated over a network. In one embodiment the context field may be stored in a look-up table on either or both the source and destination of the information. In other embodiments the context field 125 or portions thereof may be derived from other message attributes as is discussed below.

In the present embodiment the context of a piece of information comprises a plurality of monotonic up functions related to possible relevance of the associated piece of information. For a given communication of a piece of information, the context will have a value which can be compared to the context value of a conflicting piece of information to identify which to keep or process. In the examples which follow, the piece of information with the largest context will be chosen. It should be mentioned that context has meaning in a relative sense. That is, a context value becomes significant when compared to another context value or to a predetermined reference context value.

Context may consist of one or more of a plurality of different values, examples of which are discussed below. The following formula represents a definition of context in terms of five values:

$$\text{Context} = \begin{aligned}&\text{monotonic up function}\\&\text{monotonic up function (-concept),}\\&\text{monotonic up function (-range),}\\&\text{monotonic up function (-focus),}\\&\text{monotonic up function (scope),}\\&\text{monotonic up function (lobby)).}\end{aligned}$$

Concept represents the number of users to which a communication is intended and the larger the concept the more users are intended to receive the information. Since concept is a negative function in the definition of context, the fewer users to which a communication is intended, the larger the contribution to context. That is, should a communication be directed to a single user the context will be larger than when the communication is directed to 10 users.

Figure 3:
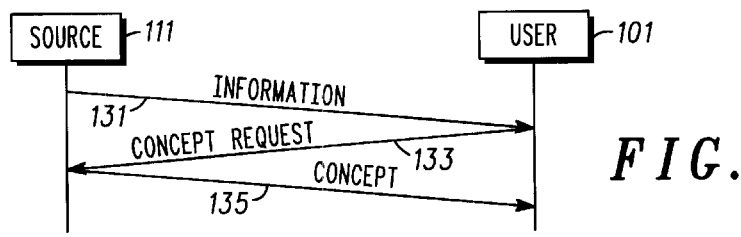
FIG. 3 is a message sequence diagram of messages between a user and a data source.

Concept may be implicit or explicit in the communication. An explicit concept is one transmitted from the information source with the communication. Such an explicit concept may be sent with the communication as part of the content or it may be available on request from the recipient. FIG. 3 represents the messaging sequence between a source, e.g. 111, and user, e.g. 101, to request a concept value. Initially, the source transmits the information 131 to the user 101. The user identifies a possible conflict and also identifies that a concept value is desirable to evaluate the received information. In this situation the user returns a concept request message 133 to the source 111 which responds by transmitting the concept value 135 to the user. The user 101 then associates the received concept value 135 with the conflicting information and appropriately selects a version of conflicting information for use.

Another value making up the context field is Range, which is the geographic or logical dispersion of the information. The wider the area of dispersion the larger the Range and, since range is a negative function of context, the larger the Range the less the context. Very generally stated, something that is very widely distributed is likely to have less relevance to an individual user than something narrowly distributed.

Range is assigned a value based on a basic range unit which in the present embodiment is a single personal computer (PC). The following table represents Range values for representative ranges:

| Range Unit | Range Value |
| --- | --- |
| Personal Computer (PC) | 1 |
| LAN Segment | No. of PCs on segment |
| LAN | No. of PCs on LAN |
| Bluetooth Pod | n where n varies based on data range |
| Wide Area Network | N based on square miles covered by network (the lowest N > highest n.) |

Figure 4:
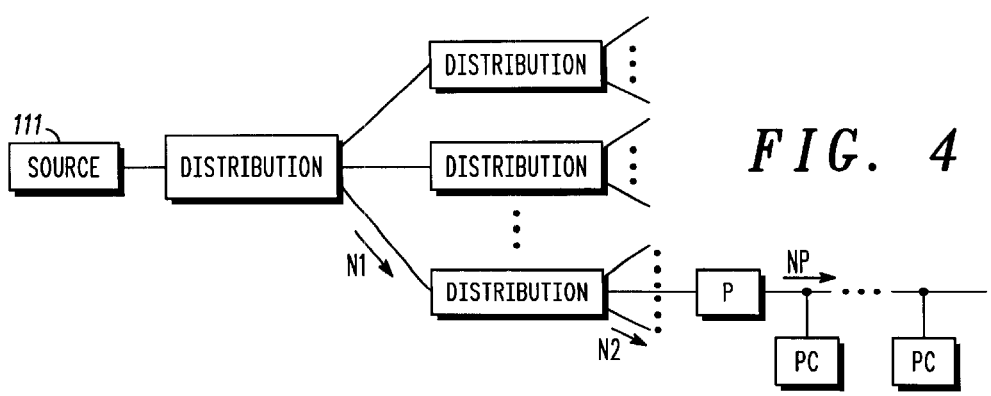
FIG. 4 is a block diagram of a data distribution system showing distribution nodes between a source and a user.

Range can be provided by the source by a forward estimate which tracks the number of conveying nodes and multiplies each node by a weighting factor determined from its type. FIG. 4 represents as network of nodes for which a forward estimate is to be determined. The estimate is generated based on the number of branches at each distribution tree or node along the route from source to user. Thus when, as shown, there is an initial number of branches N1, a second number of branches N2 and a final number of recipients NP, the Range value is $$N1 \times N2 \times NP$$

Reverse estimation of Range is also possible. For a reverse estimate each element of the distribution (store and forward) chain reports back to the source its range for the communication. Each element in the chain takes the input of all its descendants and sums them. The source, e.g. 111, FIG. 4, receives all of the "report backs" from the elements and computes the range value which can then be forwarded to the receiving users. As with Concept, the range may be sent with the piece of information being sent or it may be sent after.

The Focus value qualifies the source from the perspective of the user. Focus may be defined in terms of the following exemplary table

| Source to User | Focus |
| --- | --- |
| Boss | 1 |
| Working Peer | n |

-continued

| Source to User | Focus |
|---|---|
| Co-worker | m |
| Outsider | p | where 1<n<m<p.

Because Focus is a negative monotonic function, the Bosses focus of 1 contributes to the largest Context value while the larger outside focus of p contributes to a smaller Context. From the above Table it can be seen that the farther the source is from the user in terms of control and/or working relationship, the smaller the contribution of focus to the context value. Focus can also be an implicit function computed either by the source or the user. For example, since Focus relates to the working closeness of the source to the user, Focus can be implied from the number of hops or firewalls through which a communication travels from source to user.

Scope is defined as a content quantitative description of the piece of information being communicated. The narrower the concentration of a communication, the larger the Scope and vice versa. Scope can be predetermined and stored in a table at the content source (server) and can be accessed for sending with the content. Scope may also be set in near real time by natural language processing of the data as it is being sent.

Lobby is a value set arbitrarily by the source to reflect the source's view of possible relevance of the communicated data. Thus the source may assign a high Lobby value for data it considers very relevant and it may assign a relatively lower value to potentially less relevant data. In order to protect against source inflating its own context value to the exclusion of the import of the other context values, limits must be placed on the values assigned to Lobby which cannot be used to overrule the other values.

From the preceding it can be observed that a context value associated with a plurality of pieces of information can be used to decide which of the pieces of information to store and/or process. A sales person at an Omaha branch office may need the current price list for widgets sizes A through ZZZ and have information in his or her computer representing such. The sales person may receive first and second new pieces of information purporting to be updates to the price list. The first piece of information may be from a clerk in the marketing group at the New York home office and distributed throughout the country to 100 branch offices including the Omaha branch. This first piece of information will have a relatively low context made up from a large concept (many recipients), a very broad range (entire country and/or many firewalls), a relatively large focus (from a distant worker).

The second price list piece of information may be from the sales person's boss on the same LAN as the sales person and directed only to six sales people on that LAN. the second piece of information will have a relatively high context made up of a high concept (few users) a relatively narrow range (all on one LAN), and a low focus (from the boss). Thus, based on the relative context of the first and second pieces of information, the second will be selected to replace or update the salesperson's current price list file.

Figure 5:
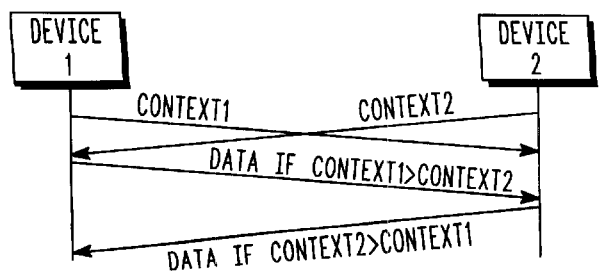
FIG. 5 is a message sequence diagram showing synchronizing messages between two devices.

The above example relates to the receipt of data from multiple sources and allows selection of data based on the Context. The convenience of the context field can be used with the same success in other situations where data selection is needed. For example, when two devices (FIG. 5) store potentially conflicting data and it is desired that the same data is saved on both devices, the devices can share context values and the data on one or the other device having the highest context can be used to update the other device. Another example of use involves the user already having a piece of information accessing an Internet server to identify whether the information at the user should be updated. Such a situation may occur when a browser accesses a web page which is already stored on the user's computer. The context field for the page on the server could be compared to the context field at the user and an update would occur only when the context at the server is larger than the context at the user. As an additional example, consider a distributed search for data over a computer network, such as might be performed by an Internet search engine. As various likely candidate files are identified by the search engine, their context values are collected and used to select or rank candidate files for user consideration.

While there have been illustrated and described particular embodiments of the present invention, it will be appreciated that numerous changes and modifications will occur to those skilled in the art, and it is intended in the appended claims to cover all those changes and modifications which fall within the scope of the present invention.

What is claimed is:

1. A method of information synchronization at a user's information responsive device comprising:

assigning a context field to information units to be accessed by the user device;

identifying at the user device a first and a second information units which include conflicting information;

analyzing the context field of both the first and the second information units to determine the respective relevance to the user of the respective first and second units of information; and selecting one of the first and second information units based on the relevance to the user determined in the analyzing step.

2. A method of accessing by a user device, units of information from an information source over a network, comprising:

assigning to a unit of information at an information source a context field representing the possible relevance of the unit of information to user devices;

receiving by the information source a request for a unit of information and a context field;

analyzing the context field from the user device and the context field assigned to the unit of information; and sending the requested unit of information by the information source to the user device only when the analyzing step indicates that the unit of information is more relevant to the user device than the relevance shown by the context field received from the user device.

3. A method in accordance with claim 2 wherein the received context field represents the relevance to the user device of another unit of information known to the user device.

4. A method of information synchronization at a user's information responsive device comprising:

assigning a context field to information units to be accessed by the user device, wherein the context field comprises a value representing at least one of: a number of users for which the information unit is intended, a geographic or logical range for which the information unit is intended, and a source from the user's perspective;

identifying at the user device a first and a second information units which include conflicting information;

analyzing the context field of both the first and the second information units to determine the respective relevance to the user of the respective first and second units of information; and selecting one of the first and second information units based on the relevance to the user determined in the analyzing step.

5. The method of claim 1 wherein the value characterizing the source represents a relationship of the source relative to the user.

6. A method in accordance with claim 1 comprising:

receiving the first information unit from a source and receiving a context field assigned to the first information unit from the source.

7. A method in accordance with claim 1 comprising receiving a context field by the user device after a reception of the information unit to which the context field is assigned.

8. A method in accordance with claim 1 comprising receiving a context field by the user device prior to a reception of the information unit to which the context field is assigned.

* * * * *